United States Patent [19]

Tomoda et al.

[11] Patent Number: 4,821,830
[45] Date of Patent: Apr. 18, 1989

[54] AUTOMOTIVE FOUR WHEEL STEERING SYSTEM

[75] Inventors: Atsuo Tomoda; Takao Kijima; Muneharu Yamada; Takaaki Itoh, all of Hiroshima, Japan

[73] Assignee: Mazda Motor Corporation, Hiroshima, Japan

[21] Appl. No.: 103,070

[22] Filed: Sep. 30, 1987

[30] Foreign Application Priority Data

Oct. 1, 1986 [JP] Japan .................................. 61-235038
Oct. 3, 1986 [JP] Japan .................................. 61-236612

[51] Int. Cl.[4] .............................................. B62D 6/02
[52] U.S. Cl. .................................... 180/140; 180/141; 280/91
[58] Field of Search ............... 180/132, 140, 141, 148, 180/152, 153, 159, 161; 280/91, 23, 24

[56] References Cited

U.S. PATENT DOCUMENTS 4,716,982  1/1988  Ishii ..................................... 180/140

FOREIGN PATENT DOCUMENTS 58-183351  10/1983  Japan .

Primary Examiner—Charles A. Marmor
Assistant Examiner—Donn McGiehan
Attorney, Agent, or Firm—Burns, Doane, Swecker & Mathis

[57] ABSTRACT

In an automotive vehicle having front and rear wheel pairs and a steering wheel drivingly coupled with the front wheel pair for steering the vehicle with respect to the direction of run of the vehicle, said steering wheel being rotatable in any one of the opposite directions from a neutral position at which the vehicle can run straightforward, an automotive four wheel steering system is provided with a right-hand rear wheel turning structure for turning the right-hand rear wheel in a direction in which the toe-in takes place, a left-hand rear wheel turning structure for turning the left-hand rear wheel in a direction in which the toe-in takes place, a right-hand rear wheel toe-out stopper for mechanically preventing the right-hand rear wheel from turning in a direction in which the toe-out takes place, a left-hand rear wheel toe-out stopper for mechanically preventing the left-hand rear wheel from turning in a direction in which the toe-out takes place, and a rear wheel operating structure for operating either one of the right-hand and left-hand rear wheel turning structure in response to running conditions of the vehicle.

16 Claims, 6 Drawing Sheets

AUTOMOTIVE FOUR WHEEL STEERING SYSTEM

BACKGROUND OF THE INVENTION

Field of the Invention

The present invention generally relates to an automobile steering system and, more particularly, to a four wheel steering system for the simultaneous steering of front and rear pairs of automotive wheels.

The development of the multi-wheel steering system in which a plurality of wheel pairs are simultaneously steered by a single steering wheel maneuvered by a driver is not new, however, the practical use of it in passenger cars is a recent trend. The multi-wheel steering system currently designed for four wheel passenger cars is available in two varieties, a mechanical linkage system and a fluid-operated system. An example of fluid-operated, four wheel steering system is disclosed in, for example, the Japanese Laid-open Patent Publication No. 58-183351, laid open to public inspection on Oct. 16, 1983, and is reproduced in FIG. 1 of the accompanying drawings for the purpose of discussion of the prior art believed to be pertinent to the present invention.

Referring to FIG. 1, there is shown a layout of the fluid-operated, four wheel steering system in relation to front and rear pairs of wheels generally identified by 1 and 4, respectively. A steering knuckle for each front wheel 1 has a spindle 7a for the support thereon of the respective front wheel 1 and a knuckle arm 7b, a free end of said knuckle arm 7b being articulatingly coupled with a respective tie rod 8a. Similarly, the rear wheels 4 are supported by respective steering knuckles each having a spindle 9a for the support thereon of the respective rear wheel 4 and a knuckle arm 9b articulated at a free end thereof to a respective tie rod 8b.

The illustrated steering system comprises a steering gear assembly 2 comprised of, for example a connecting rod 11, provided a a substantially intermediate portion thereof with a rack gear and having its opposite ends pivotally connected with the tie rods 8a, and a pinion gear constantly meshed with the rack gear and operatively coupled with a steering shaft 2a. The steering shaft 2a has a steering wheel 2b rigidly mounted on one end thereof remote from the steering gear assembly 2.

A front cylinder 3 having a piston rod 3a whose opposite ends protrude outwardly from the front cylinder housing is rigidly secured to the housing for the steering gear assembly with the piston rod 3a extending parallel to the longitudinal axis of the connecting rod 11. This front cylinder 3 is described as having left-hand and right-hand working chambers separated from each other by a piston member rigidly mounted on a substantially intermediate portion of the piston rod 3a.

A rear cylinder or rear wheel steering cylinder 5 is similar in structure to the front cylinder 3 and has a piston rod 5a whose opposite ends protrude outwardly from the rear cylinder 5 and are in turn pivotally coupled with the respective tie rods 8b. This rear cylinder 5 is also described as having left-hand and right-hand working chambers separated from each other by a piston member rigidly mounted on a substantially intermediate portion of the piston rod 5a. As a matter of practice, the housing for the rear cylinder 5 is rigidly secured to a portion of the automobile body structure with the piston rod 5a extending parallel to the widthwise direction of the automobile body structure.

As shown, a pair of pipe lines, generally identified by 6, are used, one connecting between the left-hand working chamber of the front cylinder 3 and the right-hand working chamber of the rear cylinder 5 and the other connecting between the right-hand working chamber of the front cylinder 3 and the left-hand working chamber of the rear cylinder 5.

For driving the piston rod 3a of the front cylinder 3, a motion translator generally identified by 35 is employed which comprises a gear box, secured rigidly to the housing of the steering gear assembly 2 and having a pinion gear meshed with the rack gear on the connecting rod 11, a cranking lever 35a having one end coupled with the pinion gear in the gear box and the other end pivotally connected with one of the opposite ends of the piston rod 3a through a connecting link 35b. This motion translator 35 is so designed and so structured that the rotation of the steering wheel 2b in one of the opposite directions from a neutral position about the steering shaft 2a can result in an axial sliding motion of the piston rod 3a. More specifically, so far as the steering wheel 2b is rotated in one of the opposite directions through a relatively small angle from the neutral position, the piston rod 3a can be axially moved in one direction, however, the further rotation of the steering wheel 2b through the increased angle can result in reversal of the direction of sliding motion of the piston rod 3a. It is described that the reversal of the direction of motion of the piston rod 3a takes place when the cranking lever 35a being pivoted moves past a position at which it aligns with the connecting link 35b.

Thus, according to the prior art fluid-operated, four wheel steering system, when the steering wheel 2b, is rotated a relatively small angle about the steering shaft 2a from the neutral position to turn the front wheels 1 in one direction, the rear wheels 4 can also be turned in the same direction as the front wheels 1, but when the steering wheel 2b is further rotated to turn the front wheels 1 further in said one direction, the rear wheels 4 can be swung in the other direction towards a normal straight position, in which the rear wheels 4 assume a parallel relationship with the longitudinal sense of the automobile body, or a position in which the rear wheels 4 are turned in a direction opposite to the direction in which the front wheels 1 are turned.

The above mentioned Japanese publication describes that the amount of turn of the rear wheel pair in one direction from the normal straight position which the rear wheel pair assumes during the straight run of the vehicle can be differentiated from that of the front wheel pair by selecting either the length of the cranking lever or the ratio of the inner bore diameter of one of the front and rear cylinders relative to that of the other of the front and rear cylinders. This is because, as clearly stated in the above mentioned Japanese publication, the distance over which the piston rod in the rear cylinder determinative of the amount of turn of the rear wheel pair moves corresponds to the amount of a fluid medium forced to flow into the rear cylinder.

The prior art steering system discussed above is satisfactory in that the use of the fluid circuit including the pipe lines provides a freedom of layout of the steering system with a view to a more efficient space utilization within the vehicle envelope, as compared with the mechanical variant wherein a motion transmitting shaft and differential gears are used. However, since the piston rod 5a for the rear wheel pair 4 is connected to the opposite rear wheels 4 only through respective rigid members such as tie rods 8b or the like, both rear wheels 4 are permitted to turn in the same direction through the same angle from respective normal straight positions which the rear wheel pair assumes when the steering wheel 2b is in the neutral position. Such a construction brings about no problem in the case where the fluid circuit is in good order. When the fluid circuit is out of order, however, the rear wheels 4 are occasionally largely turned in a direction opposite to the direction in which the front wheels 1 are turned, thus inviting liability in which the automotive vehicle is caused to be unstable, during a high speed run thereof.

SUMMARY OF THE INVENTION

Accordingly, the present invention has been developed with a view to substantially eliminating the above described problem inherent in the prior art fluid-operated, four wheel steering system, and has for its essential object to provide an improved four wheel steering system which provides a substantial fail-safe capability in the event of break-down of the pressure of a fluid medium or the like.

To this end, there is provided according to the present invention an improved four wheel steering system for an automotive vehicle having front and rear wheel pairs and a steering wheel drivingly coupled with the front wheel pair for steering the vehicle with respect to the direction of run of the vehicle, which system comprises a right-hand rear wheel turning means for turning the right-hand rear wheel in a direction in which the toe-in takes place, a left-hand rear wheel turning means for turning the left-hand rear wheel in a direction in which the toe-in takes place, a right-hand rear wheel toe-out stopper means for mechanically preventing the right-hand rear wheel from turning in a direction in which the toe-out takes place, a left-hand rear wheel toe-out stopper means for mechanically preventing the left-hand rear wheel from turning in a direction in which the toe-out takes place, and a rear wheel operating means for operating either one of the right-hand and left-hand rear wheel turning means in response to running conditions of the vehicle.

According to the present invention, there are provided not only two separated fluid chambers and two independently driven rear steering rods in the rear cylinder member, but also rear wheel toe-out stopper means for preventing each rear wheel from turning in a certain direction, that is, in a direction in which the toe-out takes place.

Accordingly, in the case where the front wheel pair is turned in either one of opposite directions, the fluid medium is supplied only into either one of the fluid chambers, resulting in that the corresponding one of the rear wheels is turned in the same direction as that in which the front wheel pair is turned, that is, in a direction in which the toe-in takes place and the toe-out stopper means prevents the other rear wheel from turing in a direction in which the toe-out takes place. Consequently, since any possible movement of each rear wheel in an unstable direction (in case of turning of the vehicle, an outside rear wheel is turned largely in a direction opposite to the direction in which the front wheel pair is turned.) can be desirably avoided in the event of break-down of the pressure of the fluid medium or the like, the fail safe capability can be assuredly attained.

BRIEF DESCRIPTION OF THE DRAWINGS

These and other objects and features of the present invention will become clear from the following description taken in conjunction with preferred embodiments thereof with reference to the accompanying drawings; in which.

DETAILED DESCRIPTION OF THE EMBODIMENTS

Figure 1:
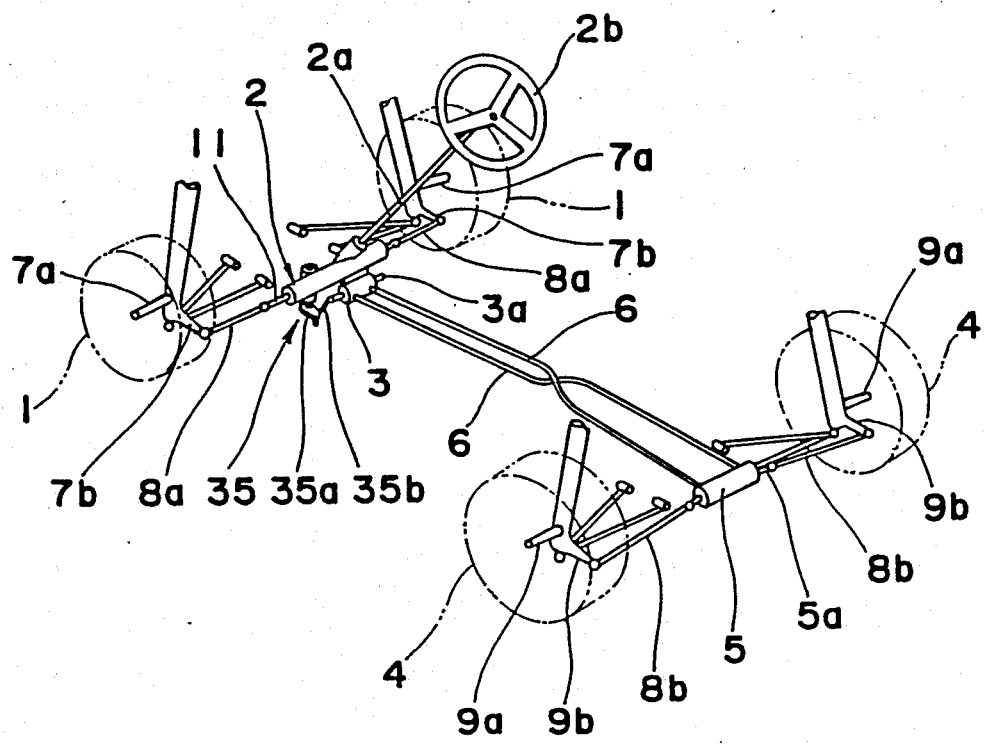
FIG. 1 is a schematic perspective skeletal view showing the prior art fluid-operated, four wheel steering system.

Before the description of the present invention proceeds, it is to be noted that like parts are designated by like reference numerals throughout the accompanying drawings.

As is well known to those skilled in the art, the four wheel steering system permits both of a pair of the front wheels and a pair of the rear wheels to be steered simultaneously or substantially simultaneously in a predetermined relationship, and, therefore, some or all of the established design parameters which are generally included in the concept of "front-end geometry," such as angular relationship between the front wheels, the front wheel attaching parts and the car frame and including, for example, the toe-in of the front wheels and the tilt of the front wheels from vertical, may be equally applicable to the rear wheel system. Also, it is very well known that the front wheels tend to toe out during turns, exhibiting a predetermined steering geometry wherein the angle of swing about the steering axis differs between the left-hand front wheel and the right-hand front wheels. This toe-out may also occur in the rear wheel system in the case of the four-wheel steerable automotive vehicle.

In view of the foregoing, the terms "amount of turn of the front wheel pair" and "amount of turn of the rear wheel pair" both used hereinbefore and hereinafter are to be understood as meaning the compromise angle of swing of a single integer of the front wheels and the compromise angle of swing of a single integer of the rear wheels, respectively, relative to the direction of straight run of the automotive vehicle. While the amount of turn of the front wheel pair is a direct function of the angle of rotation of the steering wheel, that is, the steering angle, the amount of turn of the rear wheel pair may or may not be a direct function of the steering angle, but is to be determined according to a desired rear wheel steering geometry which may or may not be identical with the front wheel steering geometry.

Figure 2:
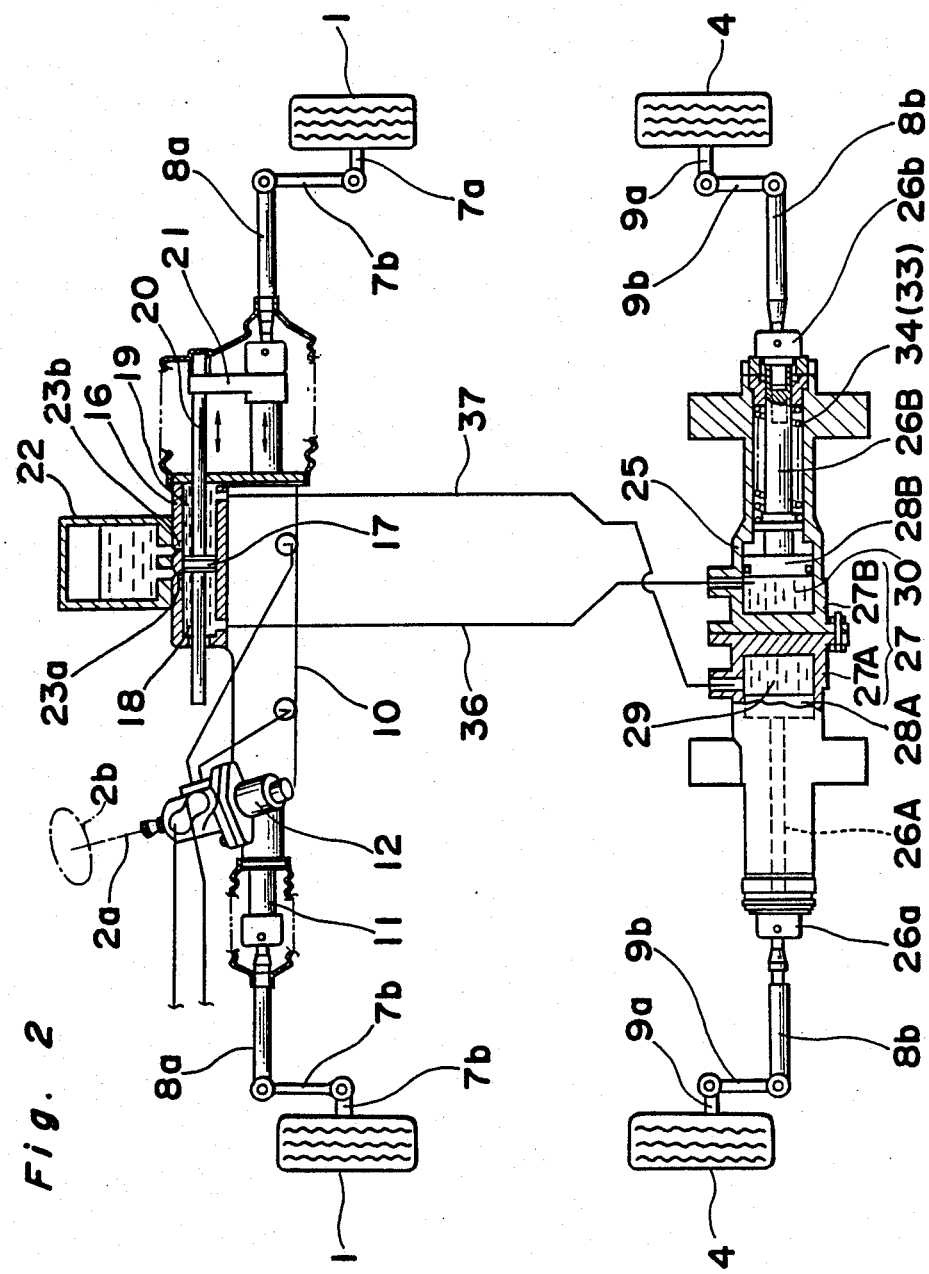
FIG. 2 is a schematic sectional diagram showing the basis of the fluid-operated, four wheel steering system to which a first embodiment of the present invention is applied.

FIG. 2 schematically illustrates the basis of a fluid-operated, four wheel steering system for simultaneously steering automotive front and rear wheel pairs, to which system a first embodiment of the present invention is applied. A steering gear assembly is shown as including a generally tubular rack housing 10 rigidly secured to a vehicle front body portion so as to extend in a direction widthwise of the vehicle body structure, a rack bar (or front wheel steering rod) 11 extending axially slidably through the rack housing 10 with its opposite ends situated outside the rack housing 10, a substantially intermediate portion of said rack bar 11 within the rack housing 10 being formed with a rack gear (not shown), and a gear box 12 secured to the rack housing 10 and accommodating therein a pinion gear (not shown) which is drivingly meshed with the rack gear on the rack bar 11. The pinion gear within the gear box 12 is in turn coupled with the steering wheel 2b through the steering shaft 2a. It is to be noted that, in FIG. 2, only for the purpose of drawing, the steering wheel 2b and its associated parts are exaggeratedly depicted as positioned on a leading side with respect to the direction of forward run of the automotive vehicle.

The opposite outer ends of the rack bar 11 are pivotally connected with the knuckle arms 7b through the tie rods 8a, respectively, so that the axial sliding movement of the rack bar 11 caused by the rotation of the steering wheel 2b from a neutral position about the steering shaft 2a can cause the front wheels 1 to swing in one of the opposite directions from a normal straight position which the front wheel pair assumes when the steering wheel 2b is in the neutral position.

The rack housing 10 carries a front cylinder 16 rigidly secured thereto so as to extend parallel thereto. The front cylinder 16 has a piston rod 20 axially slidably extending therethrough with its opposite ends situated outside the front cylinder 16, the interior of said front cylinder 16 being divided into left-hand and right-hand fluid chambers 18 and 19 by a piston member 17 that is rigidly mounted on the piston rod 20 for movement together therewith within the front cylinder 16. One of the opposite, outer ends thereof as viewed in FIG. 2, is coupled with the rack bar 11 through a connecting arm 21 so that the movement of the rack bar 11 can be accompanied by the corresponding axial movement of the piston rod 20.

Rigidly mounted on the front cylinder 16 is a reservoir tank 22, the interior of which is communicated with the left-hand and right-hand fluid chambers 18 and 19 in the front cylinder 16 through ports 23a and 23b defined in the wall of the front cylinder 16 for supplementing the fluid medium, for example, the hydraulic medium, which has leaked, from the reservoir tank 22 into the left-hand and right-hand fluid chamber 18 and 19 in the front cylinder 16.

The illustrated steering system also includes a generally tubular rod casing 25 rigidly secured to a vehicle rear body portion so as to extend in a direction widthwise of the vehicle body structure and having therein two independent rear steering rod, left-hand and right-hand rear steering rods 26A and 26B, axially slidably extending therethrough, with their outer ends situated outside the rod casing 25 and pivotally connected with steering knuckles through associated tie rods 8b. The rear wheels 4 are supported by respective steering knuckles each having a spindle 9a for the support thereon of the respective rear wheel 4 and a knuckle arm 9b articulated at a free end thereof to respective tie rod 8b. Independent piston members 28A and 28B are rigidly mounted on, or otherwise integrally formed with, respective inner ends of the left-hand and right-hand rear steering rods 26A and 26B while being axially slidably accommodated respectively within left-hand and right-hand fluid chambers 29 and 30 that are defined within a rear cylinder member 27 forming a portion of the rod casing 25 rigidly secured to a rear portion of the automobile body. It is to be noted that in FIG. 2, although the rear cylinder member 27 is composed of a left-hand rear cylinder 27A and a right-hand rear cylinder 27B, both of which are securely connected to each other through a plurality of coupling bolts, these cylinders 27A and 27B may be integrally formed into a one-piece construction. The right-hand and left-hand fluid chambers 30 and 29 are communicated with the left-hand and right-hand fluid chambers 18 and 19 in the front cylinder 16 through respective first and second fluid passages 36 and 37.

Within the rod casing 25, compression springs 33 and 34 encircling respective rear steering rods 26A and 26B are provided to inwardly bias them towards each other upon centering of respective piston members 28A and 28B. Toe-out stopper means 26a and 26b are provided at the outer ends of respective rear steering rods 26A and 26B to be brought into contact with the opposite ends of the rod casing 25 so that the inward axial movement of the rear steering rods 26A and 26B, that is, the turn of the rear wheels 4 in a direction in which the toe-out takes place may be prevented.

Figure 5A:
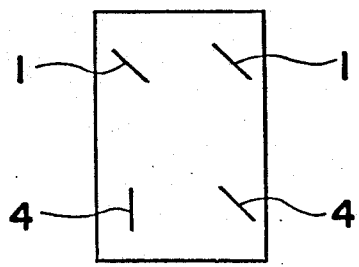
FIGS. 5(a) and 5(b) are schematic diagrams showing the respective manners in which the front and rear pairs of the wheels are swung when the automotive vehicle is desired to be turned leftwards and rightwards, respectively.

In the construction so far described, it is clear that, when the steering wheel 2b is rotated in one direction from the neutral position to turn the front wheel pair in one direction from the normal straight position, for example, leftwards with respect to the direction of forward run of the vehicle, the rack bar 11 is displaced leftwards as viewed in FIG. 2, with the piston member 17 on the piston rod 20 consequently displaced leftwards. Once this occurs, a fluid medium within the left-hand fluid chamber 18 in the front cylinder 16 is forced to flow only into the right-hand fluid chamber 30 of the rear cylinder member 27 through the first fluid passage 36 to increase the pressure inside the right-hand fluid chamber 30. Consequent upon the increase of the pressure inside the right-hand fluid chamber 30, the right-hand piston member 28B together with the right-hand rear steering rod 26B is displaced rightwards, resulting, by way of the knuckle arm 9b, only in the leftward swing of the right-hand rear wheel in a direction in which the toe-in takes place. In this event, as shown in FIG. 5a, the toe-out stopper means 26a of the left-hand rear steering rod 26A prevents the left-hand rear wheel 4 from turning leftwards in a direction in which the toe-out takes place. Accordingly, even if the steering of the rear wheels 4 can not be controlled in the event of break-down of the pressure of the fluid medium or the like, since the toe-out stopper means 26a or 26b inevitably prevents the corresponding rear wheel 4 from displacing in a direction in which the toe-out takes place, inside one of the rear wheels 4 during the turn of the vehicle can be prevented from turning in the same direction as that in which the front wheel pair is turned so that the over-steering characteristic may be assuredly avoided. Such construction is advantageous in that any possible movement of each rear wheel 4 in an unstable direction can be desirably avoided.

Under these circumstances, since the right-hand rear wheel 4 being of the outside rear wheel during the turn of the vehicle and exerting great influence upon the turn, is caused to turn in the same direction as that in which the front wheel pair is turned, the turn of the vehicle can be desirably stabilized, especially during the high speed drive thereof.

Figure 5B:
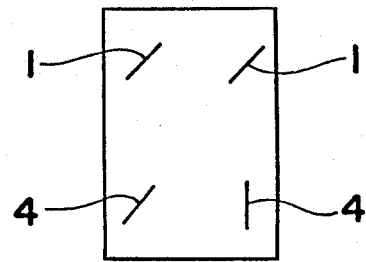

Conversely, as shown in FIG. 5b, when the steering wheel 2b is rotated in the opposite direction from the neutral position to turn the front wheel pair 1 rightwards from the normal straight position, the piston rod 20 is displaced rightwards in response to the rightward displacement of the rack bar 11, with the piston member 17 consequently forcing the fluid medium within the right-hand fluid chamber 19 in the front cylinder 16 to flow through the second fluid passage 37 into the left-hand fluid chamber 29 of the rear cylinder 27 to increase the pressure inside the left-hand fluid chamber 29. Consequent upon the increase of the pressure inside the left-hand fluid chamber 29, the left-hand rear steering rod 26A is displaced leftwards, resulting in the rightward swing of only the left-hand rear wheel 4 in a direction in which the toe-in takes place. In this event, the right-hand toe-out stopper means 26b of the right-hand rear steering rod 26B prevents the right-hand rear wheel 4 from turning rightwards (that is, in a direction in which the toe-out takes place).

Figure 3:
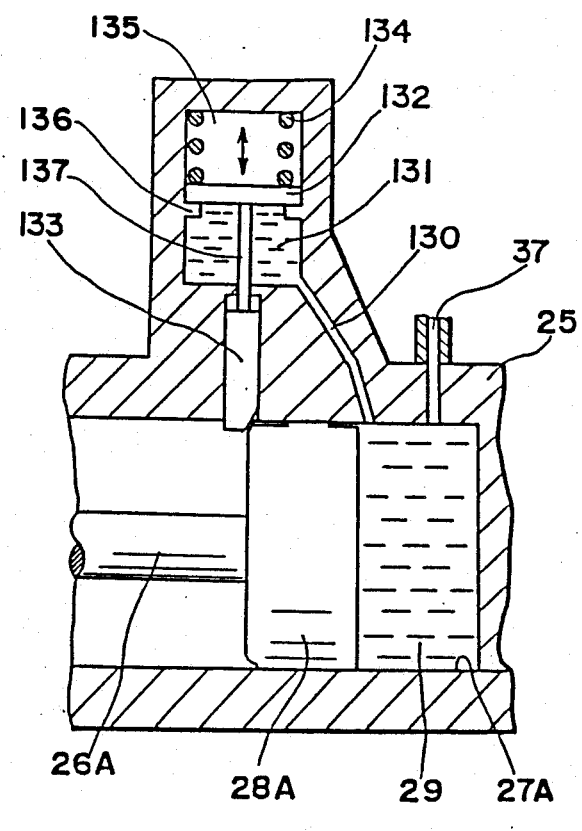
FIG. 3 is a fragmentary sectional view of a main portion of FIG. 2 which particularly shows a modification thereof.

FIG. 3 partly illustrates the left-hand rear cylinder 27A of the rear cylinder member 27 having therein a rear wheel holding means. It is to be noted that the rear wheel holding means will be described hereinafter only with respect to the left-hand rear cylinder 27A, since a right-hand rear wheel holding means is arranged symmetrically with respect to that of the left-hand rear cylinder 2A shown in FIG. 3.

An additional compartment defining therein a fluid chamber 131 and a spring chamber 135 is formed in the rod casing 25 of the left-hand rear cylinder 27A at an upper portion thereof, with both chambers 131 and 135 separated from each other by a piston member 132. An annular engagement 136 with which the piston member 132 is brought, at its lower surface, into contact is formed at a substantially intermediate portion inside the additional compartment. The fluid chamber 131 communicates with the left-hand fluid chamber 29 through a communicating passage 130 and the spring chamber 135 accommodates a compression spring 134 for biasing the piston member 132 downwards. A stopper member 133 is rigidly connected to the piston member 132 through a rod member 137 and disposed freely reciprocably together therewith in the rod casing 25. When the piston member 132 is in contact, at its lower surface, with the annular engagement 136, the stopper member 133 restricts the leftward movement of the piston member 28A disposed in the left-hand rear cylinder 27A upon contact with the rear surface of the piston member 28A. By such construction, in the case where the fluid medium in the left-hand fluid chamber 29 of the rear cylinder 27 is not pressurized during the straight run of the vehicle or in the event of break-down of the fluid circuit, an unstable condition of the rear wheel pair 4 can be assuredly avoided, since the left-hand and right-hand piston members 28A and 28B are not allowed to move respectively leftwards and rightwards by the rear wheel holding members 133.

When the fluid medium in the left-hand fluid chamber 29 is pressurized during the steering, the fluid medium in the fluid chamber 131 of the additional compartment is also pressurized through the communicating passage 130, thus resulting in that the stopper member 133 together with the piston member 132 is caused to retreat against a biasing force of the compression spring 134 to enable the piston member 28A of the left-hand rear cylinder 27A to move freely leftwards.

Figure 4:
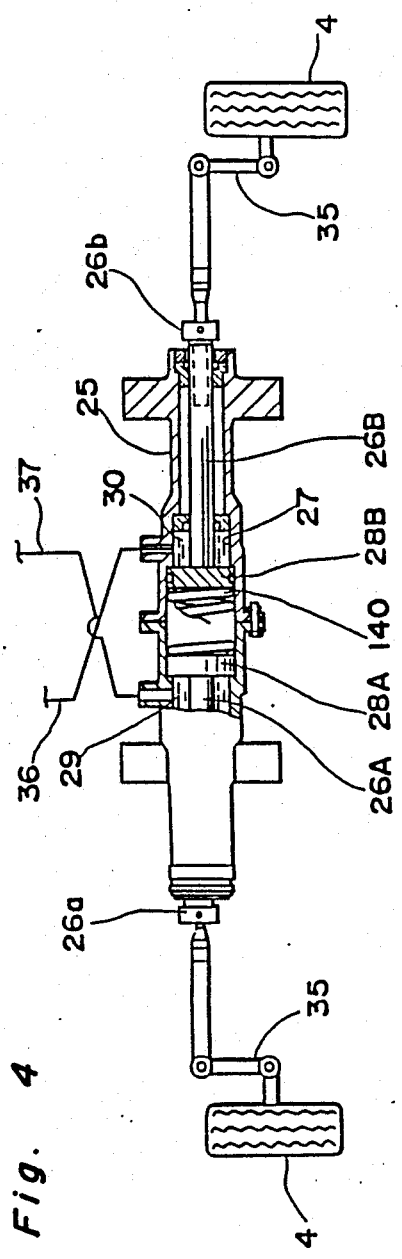
FIG. 4 is a schematic sectional diagram of a rear portion of the fluid-operated, four wheel steering system according to a second embodiment of the present invention.

It is to be noted that although the rear wheel pair is arranged on the front side of the rear cylinder member 27 in the first embodiment as shown in FIG. 2, said pair may be arranged on the rear side of the rear cylinder member 27, as shown in FIG. 4.

FIG. 4 illustrates a second embodiment of the present invention having a compression spring 140 for centering use in a substantially intermediate portion of the rear cylinder member 27 to simultaneously outwardly bias the left-hand and right-hand piston members 28A and 28B respectively in opposite directions. Opposite shoulder portions stepped down from the intermediate portion of the rear cylinder member 27 and having an inner bore diameter smaller than that of the intermediate portion function to restrict the outward axial movement of the piston members 28A and 28B.

Even by such arrangement, when the front wheel pair 1 is requested to turn leftwards, the piston member 17 of the front cylinder 16 is caused to move leftwards as in the aforementioned first embodiment. The pressurized fluid medium is, then, supplied only into the right-hand fluid chamber 30 through the first fluid passage 36 to displace the right-hand piston member 28B leftwards, resulting in that only the right-hand rear wheel 4 is turned leftwards (that is, in a direction in which the toe-in takes place) through the knuckle arm 35, as shown in FIG. 5a.

Similarly, in the case where the front wheel pair 1 is turned rightwards, only the left-hand rear wheel 4 is caused to turn rightwards (that is, in a direction in which the toe-in takes place), as shown in FIG. 5b.

It is to be noted here that in the foregoing embodiments, for the purpose of easy understanding, although the displacement of the rear wheels 4 is restricted by the toe-out stopper means 26a and 26b in a direction in which the toe-out takes place, it may be so designed that only a large displacement of the rear wheels 4 is restricted in a direction in which the toe-out takes place, whereas a small displacement thereof in the same direction is permitted. A certain amount of such small displacement can be suitably determined.

It is further to be noted that in the foregoing embodiments, although the rear wheel pair 4 is turned with the use of the fluid-operated system, such system may be replaced by an electrically operated system including at least one electric motor operatively associated with the rear wheel pair 4.

Figure 6:
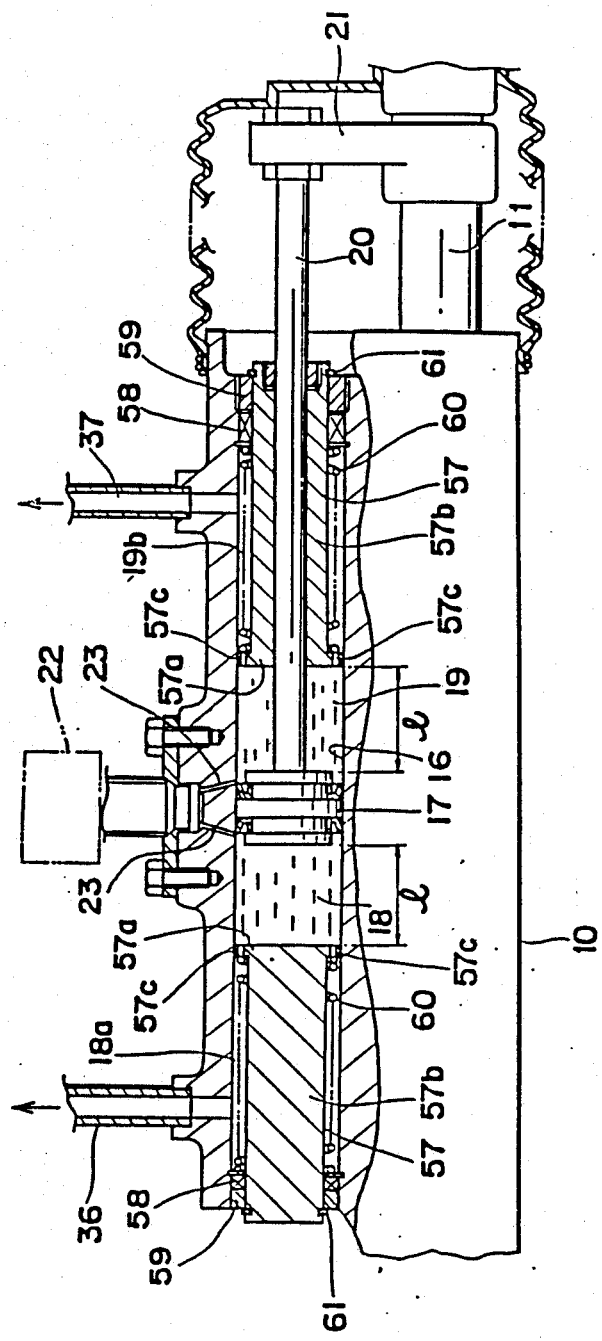
FIG. 6 is a longitudinal sectional view of a front cylinder used in the fluid-operated, four wheel steering system, in which cylinder an effective cylinder area changing means is incorporated.
Figure 7:
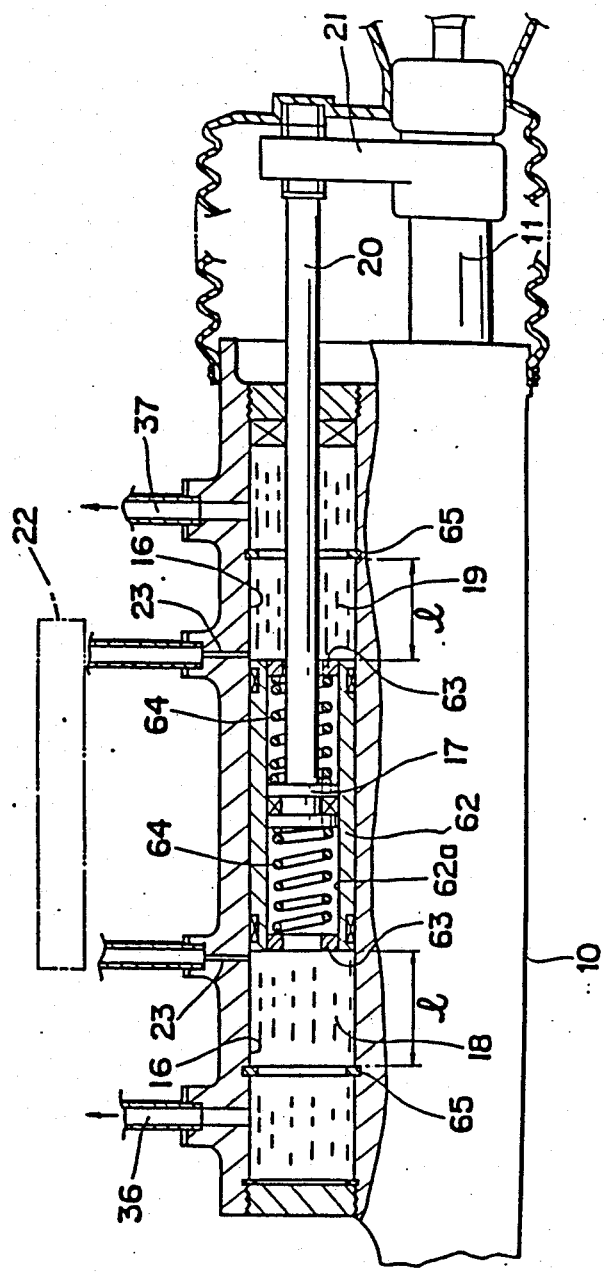
FIG. 7 is a view similar to FIG. 6, for particularly showing a modification of the effective cylinder area changing means.

In the next place, means for changing an effective cylinder area to permit the amount of turn of the rear wheel pair from the normal straight position to be reduced in the event of the displacement of the piston member 17 over a predetermined stroke is illustrated in FIG. 6 or 7. Such means will be referred to as an effective cylinder area changing means hereinafter and can be applied to either of the above described embodiments of the present invention.

As shown in FIG. 6, the effective cylinder area changing means includes, on each side of the piston member 17, a movable member 57 freely slidably disposed inside the front cylinder 16, a seal member 58 for fluid-tightly sealing an outer end portion of the movable member 57, and a guide member 59 for slidably supporting therein the movable member 57. The movable member 57 has a first portion 57a of a diameter identical with the inner bore of the front cylinder 16 and a second portion 57b of a diameter slightly smaller than the inner bore of the front cylinder 16. A fluid chamber 18a or 19a is annularly defined between the front cylinder 16 and the second portion 57b of the movable member 57 and accommodates a compression spring 60 for biasing the movable member 57 inwardly, with a stopper ring 61 being rigidly secured to an end portion of the movable member 57 to restrict the inward axial movement thereof upon contact with the guide member 59. A plurality of through-holes 57c are formed along the periphery of the first portion 57a of the movable member 57 so that the fluid chamber 18 or 19 may communicate with the associated fluid chamber 18a or 19a. When the piston member 17 is in the neutral position during the straight run of the vehicle, a distance between the piston member 17 and the right-hand or left-hand movable member 57 is set to be identical with a stroke l corresponding to a predetermined steering angle.

Such being the construction, in the case where the front wheel pair 1 is requested to turn, for example, leftwards during a high speed run of the vehicle, the steering wheel 2b is initially rotated normally through a relatively small angle from the neutral position. In this event, since the piston member 17 of the front cylinder 16 slides leftwards only through a small stroke less than the predetermined stroke l, the effective cylinder area is identical with a sectional area S1 of the left-hand fluid chamber 18, thus resulting in that the fluid medium is supplied in the amount of (stroke of the piston member 17×S1) towards the right-hand rear cylinder 27B through the through-holes 57c defined in the first portion 57a of the left-hand movable member 57. Accordingly, the amount of the fluid medium to be supplied is constant at all times and never be reduced.

Figure 9:
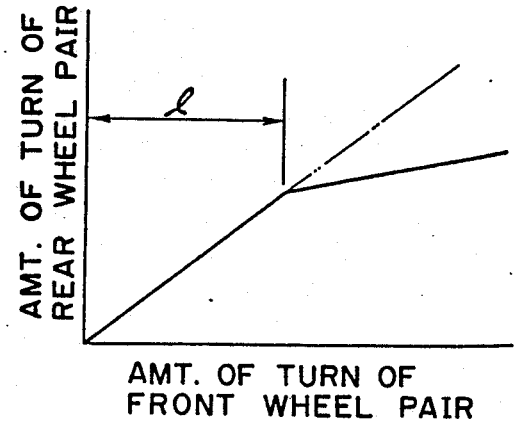
FIG. 9 is a graph showing the relationship between the amount of turn of the rear wheel pair and that of the front wheel pair.

Under these conditions, that is, in the case where the stroke of the piston member 17 is less than the predetermined stroke l, the amount of turn of the front wheel pair 1 is in proportion to the amount of turn of the right-hand rear wheel 4, as shown in FIG. 9, with a proportionality factor being equal to approximately 1 or a numerical value close to 1. Consequently, since the right-hand rear wheel 4 is turned largely leftwards, that is, in the same direction as that in which the front wheel pair 1 is turned, the stability of the vehicle during the high speed run can be improved.

On the other hand, during a low speed run, since the steering wheel 2b is rotated leftwards generally through a relatively large angle from the neutral position, the piston member 17 of the front cylinder 16 is caused to slide leftwards through a large stroke greater than the predetermined one l.

In this event, the piston member 17 is brought into contact with the left-hand movable member 57 and moves together therewith against the biasing force of the compression spring 60, thus resulting in that the effective cylinder area of the front cylinder 16 becomes to be identical with a sectional area S2 (S1>S2) of the annularly defined left-hand fluid chamber 18a delimited by the front cylinder 16 and the left-hand movable member 57 and the fluid medium is supplied by the first portion 57a of the left-hand movable member 57. Accordingly, since the effective cylinder area is substantially reduced, the amount of the fluid medium to be supplied into the right-hand fluid chamber 30 of the rear cylinder member 27 is also reduced.

Consequently, since the amount of turn of the right-hand rear wheel 4 becomes small as compared with that of the front wheel pair 1, the cornering characteristic during the low speed run of the vehicle can be improved.

FIG. 7 illustrates a modification of the effective cylinder area changing means comprising a hollow movable member 62 freely slidably disposed inside the front cylinder 16, with the piston member 17 freely slidably disposed inside the movable member 62 and having a diameter identical with that of a hollow portion 62a defined in the movable member 62. The hollow portion 62a of the movable member 62 is delimited by a couple of annular covers 63 rigidly mounted on opposite end portions of the movable member 62 and is divided into two chamber parts by the piston member 17, with the chamber parts each accommodating a compression spring 64 interposed between the piston member 17 and the right-hand or left-hand annular cover 63. The piston member 17 is biased by the compression springs 64 to normally locate at its neutral position, that is, at the central portion inside the movable member 62. An annularly formed stopper 65 is rigidly mounted in each of the right-hand and left-hand fluid chambers 19 and 18 to bring the movable member 62 to a stop at the time when the piston member 17 has caused the movable member 62 to move through the predetermined stroke l from its neutral position.

In this construction, on the occasion of, for example, the leftward turn of the front wheel pair 1 during the high speed drive of the vehicle, since the steering wheel 2b is rotated through a relatively small angle, the movable member 62 together with the piston member 17 of the front cylinder 16 slides leftwards only through a small stroke less than the predetermined one l, thus resulting in that the unchanged effective cylinder area brings about the constant amount of the fluid medium to be supplied.

On the contrary, during the low speed run, since the steering wheel 2b is rotated through a relatively large angle, the movable member 62 together with the piston member 17 of the front cylinder 16 slides leftwards through a large stroke greater than the predetermined one l.

Accordingly, the movable member 62 is brought into contact with the left-hand stopper 65 and the piston member 17 is, then, caused to slide leftwards against the biasing force of the compression spring 64, thus resulting in that the fluid medium is supplied only by the piston member 17 of a diameter smaller than that of the movable member 62. Consequently, since the effective cylinder area is substantially reduced, the amount of the fluid medium to be supplied into the right-hand fluid chamber 30 of the rear cylinder member 27 is also reduced.

Figure 8:
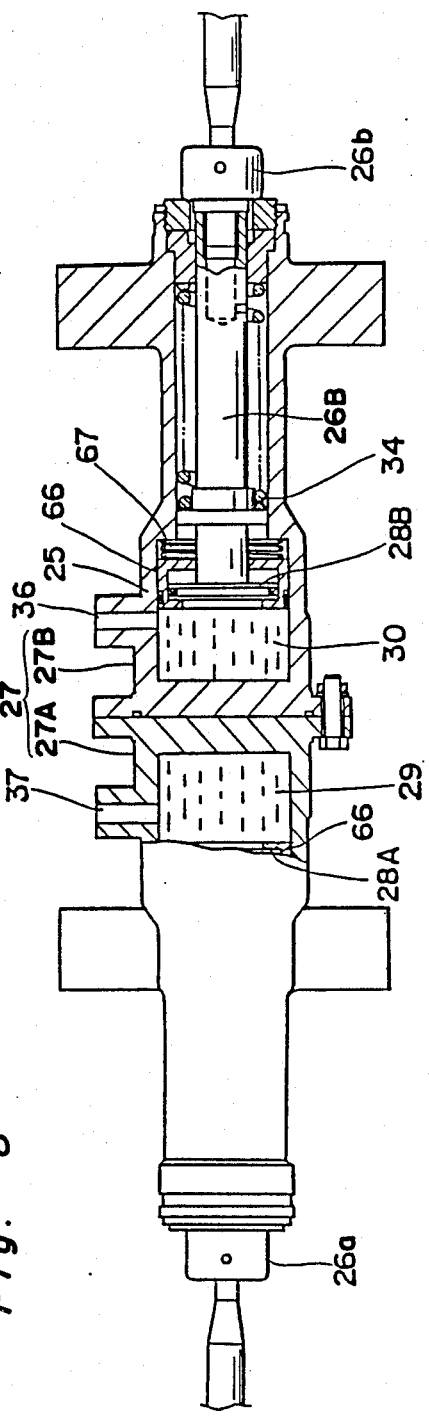
FIG. 8 is a longitudinal sectional view of a rear cylinder member used in the fluid-operated, four wheel steering system, in which cylinder member a further modification of the effective cylinder area changing means is incorporated.

A further modification of the effective cylinder area changing means is shown in FIG. 8 and comprises, in each of the left-hand and right-hand rear cylinder 27A and 27B shown in FIG. 2, a hollow movable member 66 freely slidably disposed in the left-hand or right-hand fluid chamber 29 or 30 of the rear cylinder member 27, with the piston member 28A or 28B freely slidably disposed within a hollow portion defined in the movable member 66. A compression spring 67 encircling the rear steering rod 26A or 26B is interposed between the movable member 66 and the shoulder portion of the rear cylinder 27 to bias the movable member 66 inwardly towards the piston member 28A or 28B. The inside of the movable member 66 communicates with the left-hand or right-hand fluid chamber 29 or 30 through an opening defined therein.

In this construction, on the occasion of, for example, the leftward turn of the front wheel pair 1 during the high speed drive of the vehicle, since the steering wheel 2b is rotated through a relatively small angle, the piston member 17 of the front cylinder 16 slides leftwards only through a relatively small stroke. Accordingly, since the amount of the fluid medium to be supplied into the right-hand fluid chamber 30 is relatively small, only the right-hand piston member 28B is displaced outwardly within a limited space inside the right-hand movable member 66 against the biasing force of the return spring 34. In this case, since the surface S2 of the right-hand piston member 28B to which the fluid pressure is applied becomes identical with the effective cylinder area of the right-hand rear cylinder 27B, the right-hand piston member 28B slides rightwards through substantially the same stroke as that of the piston member 17 of the front cylinder 16 due to the fact that the right-hand piston member 28B is displaced at a relatively high rate in compliance with the increase of the amount of the fluid medium.

Accordingly, since the amount of turn of the right-hand rear wheel 4 corresponds to the amount of turn of the front wheel pair 1 in a ratio of approximately 1:1 or a ratio close thereto, as shown in FIG. 9, the right-hand rear wheel 4 is turned leftwards, that is, in the same direction as that in which the front wheel pair 1 is turned.

On the other hand, during the low speed run, since the steering wheel 2b is rotated generally through a relatively large angle from the neutral position, the piston member 17 of the front cylinder 16 is caused to slide leftwards through a relatively large stroke, thus resulting in that the amount of the fluid medium to be supplied into the right-hand fluid chamber 30 of the rear cylinder member 27 increases.

Because of this, the right-hand piston member 28B is brought into contact with the right-hand movable member 66 to cause it to move against the biasing force of the compression spring 67. As a result, since the effective cylinder area increases due to the fact that the effective sectional area S1 (S1>S2) of the right-hand movable member 66 of a diameter larger than that of the right-hand piston member 28B becomes the effective cylinder area, the right-hand piston member 28B operatively associated with the right-hand movable member 66 slides through a reduced stroke.

Accordingly, as shown in FIG. 9, since the amount of turn of the right-hand rear wheel 4 is reduced as compared with that of the front wheel pair 1, the right-hand rear wheel 4 is turned through an amount smaller than that of the front wheel pair 1 leftwards, i.e., in the same direction as that in which the front wheel pair 1 is turned.

It is to be noted that in the foregoing description, although means for changing the effective cylinder area is provided in either of the front and rear cylinder members, such means may be provided in the course of the first and second fluid passages 36 and 37.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In an automotive vehicle having front and rear wheel pairs and a steering wheel drivingly coupled with the front wheel pair for steering the vehicle with respect to the direction of run of the vehicle, said steering wheel being rotatable in any one of the opposite directions from a neutral position at which the vehicle can run straightforward, an automotive four wheel steering system which comprises:
   a right-hand wheel turning means for turning the right-hand rear wheel in a direction in which toe-in takes place;
   a left-hand rear wheel turning means for turning the left-hand rear wheel in a direction in which toe-in takes place;
   a right-hand rear wheel toe-out stopper means for mechanically preventing the right-hand rear wheel from turning in a direction in which toe-out takes place;
   a left-hand rear wheel toe-out stopper means for mechanically preventing the left-hand rear wheel from turning in a direction in which toe-out takes place, said right-hand rear wheel toe-out stopper means and said left-hand rear wheel toe-out stopper means being spaced from each other in a direction perpendicular to the direction of run of the automotive vehicle so as to act independently of each other; and a rear wheel operating means for operating either one of the right-hand and left-hand rear wheel turning means in response to running conditions of the vehicle.

2. The steering system as claimed in claim 1, wherein said right-hand rear wheel turning means comprises a first fluid chamber means to turn the right-hand rear wheel in a direction in which the toe-in takes place at the time when a fluid medium is supplied into said first fluid chamber means, whereas said left-hand rear wheel turning means comprises a second fluid chamber means to turn the left-hand rear wheel in a direction in which the toe-in takes place at the time when the fluid medium is supplied into said second fluid chamber means.

3. In an automotive vehicle having front and rear wheel pairs and a steering wheel drivingly coupled with the front wheel pair for steering the vehicle with respect to the direction of run vehicle, said steering wheel being rotatable in any one of the opposite directions from a neutral position at which the vehicle can run straightforward, an automotive four wheel steering system which comprises:

a right-hand wheel turning means for turning the right-hand rear wheel in a direction in which toe-in takes place, including a first fluid chamber means to turn the right-hand rear wheel in a direction in which toe-in takes place at the time when a fluid medium is supplied into said first fluid chamber means;

a left-hand rear wheel turning means for turning the left-hand rear wheel in a direction in which toe-in takes place, including a second fluid chamber means to turn the left-hand rear wheel in a direction in which toe-in takes place at the time when the fluid medium is supplied into said second fluid chamber means;

a right-hand rear wheel toe-out stopper means for mechanically preventing the right-hand rear wheel from turning in a direction in which toe-out takes place;

a left-hand rear wheel toe-out stopper means for mechanically preventing the left-hand rear wheel from turning in a direction in which toe-out takes place;

a rear wheel operating means for operating either one of the right-hand and left-hand rear wheel turning means in response to running conditions of the vehicle; and said right-hand rear wheel turning means further comprises a right-hand rear steering rod means having one end connected to a right-hand rear wheel support means, a first piston means rigidly secured to the other end of said right-hand rear steering rod means and a right-hand rear cylinder means for slidably supporting therein said first piston means, said right-hand rear wheel support means being operatively coupled to the right-hand rear wheel, whereas said left-hand rear wheel turning means further comprises a left-hand rear steering rod means having one end connected to a left-hand rear wheel support means, a second piston means rigidly secured to the other end of said left-hand rear steering rod means and a left-hand rear cylinder means for slidably supporting therein said second piston means, said left-hand rear wheel support means being operatively coupled to the left-hand rear wheel.

4. In an automotive vehicle having front and rear wheel pairs and a steering wheel drivingly coupled with the front wheel pair for steering the vehicle with respect to the direction of run of the vehicle, said steering wheel being rotatable in any one of the opposite directions from a neutral position at which the vehicle can run straightforward, an automotive four wheel steering system which comprises:

a right-hand wheel turning means for turning the right-hand rear wheel in a direction in which toe-in takes place, including a first fluid chamber means to turn the right-hand rear wheel in a direction in which toe-in takes place at the time when a fluid medium is supplied into said first fluid chamber means;

a left-hand rear wheel turning means for turning the left-hand rear wheel in a direction in which toe-in takes place, including a second fluid chamber means to turn left-hand rear wheel in a direction in which toe-in takes place at the time when the fluid medium is supplied into said second fluid chamber means;

a right-hand rear wheel toe-out stopper means for mechanically preventing the right-hand rear wheel from turning in a direction in which the toe-out takes place;

a left-hand rear wheel toe-out stopper means for mechanically preventing the left-hand rear wheel turning in a direction in which the toe-out takes place;

a rear wheel operating means for operating either one of the right-hand and left-hand rear wheel turning means in response to running conditions of the vehicle; and said right-hand rear wheel turning means further comprises a first biasing means for biasing the right-hand rear wheel in a direction in which said right-hand rear wheel toe-out stopper means functions, whereas said left-hand rear wheel turning means further comprises a second biasing means for biasing the left-hand rear wheel in a direction in which said left-hand rear wheel toe-out stopper means functions.

5. In an automotive vehicle having front and rear wheel pairs and a steering wheel drivingly coupled with the front wheel pair for steering the vehicle with respect to the direction of run of the vehicle, said steering wheel being rotatable in any one of the opposite directions from a neutral position at which the vehicle can run straightforward, an automotive four wheel steering system which comprises:

a right-hand rear wheel turning means for turning the right-hand rear wheel in a direction in which toe-in takes place, including a first fluid chamber means to turn the right-hand rear wheel in a direction in which toe-in takes place at the time when a fluid medium is supplied into said first fluid chamber means;

a left-hand rear wheel turning means for turning the left-hand rear wheel in a direction in which toe-in takes place, including a second fluid chamber means to turn the left-hand rear wheel in a direction in which toe-in takes place at the time when the fluid medium is supplied into said second fluid chamber means;.

a right-hand rear wheel toe-out stopper means for mechanically preventing the right-hand rear wheel from turning in a direction in which toe-out takes place;

a left-hand rear wheel toe-out stopper means for mechanically preventing the left-hand rear wheel from turning in a direction in which toe-out takes place;

a rear wheel operating means for operating either one of the right-hand and left-hand rear wheel turning means in response to running conditions of the vehicle; and further including a fluid-operated front cylinder means, a first fluid passage means and a second fluid passage means, said fluid-operated front cylinder means including a front piston means operatively associated with the front wheel pair and a front cylinder means for slidably therein said front piston means, and defining therein the chambers separated from each other by said front piston means, one chamber communicating with said first fluid chamber means through said first fluid passage means and the other chamber communicating with said second fluid chamber means through said second fluid passage means.

6. The steering system as claimed in claim 3, wherein said first fluid chamber means is delimited by said right-hand rear cylinder means and said first piston means on a side opposite to said right-hand rear steering rod means, whereas said second fluid chamber means is delimited by said left-hand rear cylinder means and said second piston means on a side opposite to said left-hand rear steering rod means.

7. The steering system as claimed in claim 6, wherein said right-hand rear wheel toe-out stopper means is disposed at the outer end of said right-hand rear wheel steering rod means to prevent the toe-out of the right-hand rear wheel upon contact with an end portion of said right-hand rear cylinder means, whereas said left-hand rear wheel toe-out stopper means is disposed at the outer end of said left-hand rear wheel steering rod means to prevent the toe-out of the left-hand rear wheel upon contact with an end portion of said left-hand rear cylinder means.

8. The steering system as claimed in claim 3, wherein said first fluid chamber means is delimited by said right-hand rear cylinder means and said first piston means on a side of said right-hand rear steering rod means, whereas said second fluid chamber means is delimited by said left-hand rear cylinder means and said second piston means on a side of said left-hand rear steering rod means.

9. The steering system as claimed in claim 8, wherein said right-hand rear wheel toe-out stopper means comprises the peripheral portion of said first piston means and a first shoulder portion formed inside said right-hand rear cylinder means of a diameter smaller than that of said first piston means, said first piston means being brought into contact at the peripheral portion thereof with said first shoulder portion to prevent the toe-out of the right-hand rear wheel, whereas said left-hand rear wheel toe-out stopper means comprises the peripheral portion of said second piston means and a second shoulder portion formed inside said left-hand rear cylinder means of a diameter smaller than that of said second piston means, said second piston means being brought into contact at the peripheral portion thereof with said second shoulder portion to prevent the toe-out of the left-hand rear wheel.

10. The steering system as claimed in claim 9, wherein said right-hand and left-hand rear cylinder means are integrally formed into a one-piece construction and a biasing means is interposed between said first and second piston means to bias them towards opposite directions.

11. The steering system as claimed in claim 5, which further comprises an effective cylinder area changing means for permitting the amount of turn of either one of the rear wheels to be reduced in the event of displacement of said front piston means over a predetermined stroke.

12. The steering system as claimed in claim 11, wherein said effective cylinder area changing means is provided inside said front cylinder means.

13. The steering system as claimed in claim 12, wherein said effective cylinder area changing means comprises, on each side of said front piston means, a movable member freely slidably disposed inside said front cylinder means and having a first portion of a diameter identical with the inner bore diameter of said front cylinder means and a second portion of a diameter smaller than that of said first portion, and a biasing means disposed between said front cylinder means and said second portion to bias said movable member inwardly, said first portion of said movable member defining, along its peripheral portion, a plurality of through-holes for permitting the fluid medium to pass therethrough.

14. The steering system as claimed in claim 12, wherein said effective cylinder area changing means comprises a movable member freely slidably disposed inside said front cylinder means, a biasing means for inwardly biasing said front piston means and a stopper means rigidly secured to said front cylinder means to bring said movable member to a stop.

15. The steering system as claimed in claim 11, wherein said effective cylinder area changing means is disposed both in said right-hand and left-hand rear cylinder means and said right-hand rear wheel turning means comprises a right-hand rear steering rod means having one end connected to a right-hand rear wheel support means, a first piston means rigidly secured to the other end of said right-hand rear steering rod means and a right-hand rear cylinder means for slidably supporting therein said first piston means, said right-hand rear wheel support means being operatively coupled to the right-hand rear wheel, whereas said left-hand rear wheel turning means comprises a left-hand rear steering rod means having one end connected to a left-hand rear wheel support means, a second piston means rigidly secured to the other end of said left-hand rear steering rod means and a left-hand rear cylinder means for slidably supporting therein said second piston means, said left-hand rear wheel support means being operatively coupled to the left-hand rear wheel.

16. The steering system as claimed in claim 15, wherein said effective cylinder area changing means comprises, in each of said right-hand and left-hand rear cylinder means, a hollow movable member freely slidably disposed inside said rear cylinder means and a biasing means for biasing said movable member inwardly, said piston means being freely slidably disposed inside said movable member.

* * * * *